(12) United States Patent
Alfvin et al.

(10) Patent No.: US 7,231,367 B1
(45) Date of Patent: Jun. 12, 2007

(54) ELECTRONIC IMAGING CAPTURE AND BILLING DISTRIBUTION SYSTEM

(75) Inventors: Richard L. Alfvin, Pittsford, NY (US); William C. Archie, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 1508 days.

(21) Appl. No.: 09/607,140

(22) Filed: Jun. 29, 2000

(51) Int. Cl.
*G06Q 40/00* (2006.01)

(52) U.S. Cl. .......................... 705/40; 705/34; 358/1.15
(58) Field of Classification Search ................. 705/40, 705/34; 358/1.15
See application file for complete search history.

(56) References Cited

U.S. PATENT DOCUMENTS

| | | | |
|---|---|---|---|
| 5,476,192 A | 12/1995 | Julinot | |
| 5,485,504 A | 1/1996 | Obnsorge | |
| 5,491,507 A | 2/1996 | Umezawa et al. | |
| 5,666,159 A | 9/1997 | Parulski et al. | |
| 5,724,092 A | 3/1998 | Davidsohn et al. | |
| 5,870,149 A | 2/1999 | Comroe et al. | |
| 5,877,975 A | 3/1999 | Jigour et al. | |
| 5,893,037 A | 4/1999 | Reele et al. | |
| 5,966,643 A | 10/1999 | Radley | |
| 5,974,401 A * | 10/1999 | Enomoto et al. ............. 705/40 |
| 5,982,853 A | 11/1999 | Liebermann | |
| 6,014,641 A * | 1/2000 | Loeb et al. .................... 705/34 |
| 6,167,469 A * | 12/2000 | Safai et al. .................... 710/62 |
| 6,385,595 B1 * | 5/2002 | Kolling et al. ................ 705/40 |
| 6,715,003 B1 * | 3/2004 | Safai ............................ 710/33 |
| 6,812,962 B1 * | 11/2004 | Fredlund et al. ......... 348/231.2 |
| 6,915,273 B1 * | 7/2005 | Parulski ........................ 705/26 |
| 7,019,862 B1 * | 3/2006 | McIntyre et al. .......... 358/1.16 |
| 7,120,593 B1 * | 10/2006 | Fry et al. ...................... 705/26 |
| 2002/0154329 A1 * | 10/2002 | Goldstein et al. .......... 358/1.15 |

FOREIGN PATENT DOCUMENTS

JP 2003092730 A * 3/2003
JP 2005102209 A * 4/2005

* cited by examiner

Primary Examiner—Narayanswamy Subramanian
(74) Attorney, Agent, or Firm—Frank Pincelli

(57) ABSTRACT

A method of managing digital images of a customer is disclosed. The method includes a telecommunication service provider providing a telecommunication service to a customer, the telecommunication service provider forwarding a periodic statement to the customer regarding the telecommunication services provided for a predetermined time period and also providing a combined portable telecommunication and digital image capture device capable of capturing digital images and for transmitting said captured images. In addition, the telecommunications service provider provides a data base for receiving and storing the captured images transmitted by the customer and also provides to the customer a visual representation of the captured images taken during the predetermined time period along with the periodic statement of services.

14 Claims, 3 Drawing Sheets

ELECTRONIC IMAGING CAPTURE AND BILLING DISTRIBUTION SYSTEM

FIELD OF THE INVENTION

This invention is in the field of methods of providing photographic services and, more specifically, it is in the field of methods of managing a customers electronic images.

BACKGROUND OF THE INVENTION

The proliferation of cellular phone technology worldwide today and the resulting convenience this service offers means that personal mobile telephones are rapidly becoming one of the most prevalent personal appliances carried by consumers. At the same time, digital cameras and digital photography have improved in quality and are also becoming more popular. Given this situation, it is inevitable that devices which combine telecommunications and digital image capture will begin to appear in the marketplace. The mobile telephone user will appreciate that since he or she is already carrying the cellular phone almost everywhere, the addition of digital capture capability offers the added convenience of the ability to make photographs essentially whenever the opportunity arises. For example, U.S. Pat. No. 5,893,037 issued to Reele, et. al. discloses a hybrid digital capture and film camera combined with cellular telephone functionality.

One problem with digital cameras is that they have a finite capacity for storage of digital data so that, for example when the removable memory device of the camera is full, at least some of the images must be transferred to other types of storage such as to a personal computer before additional images can be captured. A means to address the problem of freeing up the memory of the digital camera would be to wirelessly transfer the images to a central depository, and in fact, the device disclosed in the '037 patent has the capability to transfer digital data using a cellular telephone. In addition, U.S. Pat. No. 5,666,159, issued to Parulski, discloses a digital camera which also has an integral cellular transceiver for the purpose of transmitting digital data to a central location. Such a transfer of image data by either the '037 or '159 devices could even be carried out automatically during off-peak hours, perhaps at a reduced charge rate. The co-pending and commonly assigned U.S. patent application Ser. No. 09/569,170, by Fredlund, discloses an appliance which can be used to perform such an automatic off-peak rate transfer of digital images, albeit not wirelessly, but instead using standard telephone lines.

With such an image capture and transfer system, a particularly serious problem of image management arises. The convenience of having a digital capture device conveniently at hand much of the time and which always has memory capacity available and is ready for capture will lead to the taking of many more photographs than with previous cameras. A means to effectively periodically manage these images is required and the present invention addresses this problem of image management.

SUMMARY OF THE INVENTION

In accordance with one aspect of the present invention there is provided a method of managing digital images captured by a customer using a combined portable telecommunications and digital image capture device, the method comprising: (a) a telecommunication service provider providing a telecommunication service to a customer, the telecommunications service provider forwarding a periodic statement for telecommunication services provided to the customer for a predetermined time period; (b) providing a data base for receiving and storing the digital images from the customer using the combined telecommunications device to transmit the digital images to the service provider; and (c) the telecommunication service provider providing to the customer a visual representation of the captured images taken during the predetermined time period along with the periodic statement.

In accordance with another aspect of the present invention there is also provided a system for managing digital images of a customer, said system comprising: (a) a telecommunication service provider providing a telecommunication service to a customer, the telecommunication service provider forwarding a periodic statement for telecommunication services provided to the customer for a predetermined time period; (b) a combined portable telecommunications and digital image capture device capable of capturing digital images and also for transmitting the captured images to the telecommunications service provider; (c) a data base for receiving and storing the captured images transmitted from the customer; and (d) a computer used by the service provider for managing and associating the telecommunications and image storage services for the customer and for providing a visual representation of the captured images captured during the predetermined time period along with the periodic statement.

In accordance with yet another aspect of the present invention there is also provided a multi-section statement form for use by a combined telecommunications and imaging services service provider, comprising: (a) a first portion of the form comprising a billing invoice for telecommunications and imaging services charges accumulated for a predetermined time period; (b) a second portion of the form comprising a hard copy index print containing images taken during a predetermined time period; and (c) a third portion of the form comprising an order form for ordering photographic goods and/or services based upon the images contained in the index print.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1A:
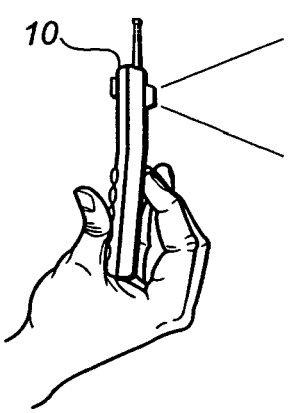
FIGS. 1a–1d are a pictorial illustration of the overall operation of a particular embodiment of the present invention.

FIGS. 1a–1d provides an overview of the operation of a preferred embodiment of the invention. In FIG. 1a the use of a combined portable telecommunications and image capture device 10 is shown in the mode of image capture by a user.

Figure 1B:
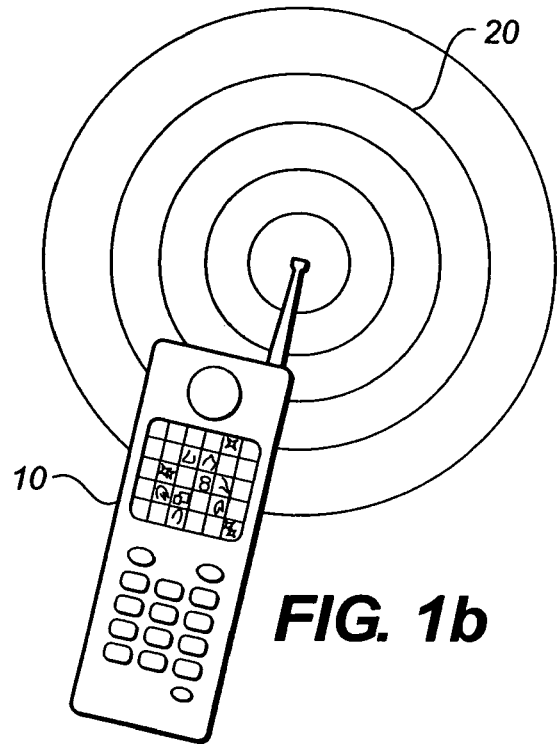

FIG. 1b shows a schematic representation of the device 10 in the data transfer mode where images are being transmitted by cellular radiotelephone communications 20 to a central storage facility, for example during off peak periods when rates for air time are lower. The central storage facility (not shown) may be provided and managed by and be physically located at a telecommunications service provider's site, or be at the telecommunications service provider's designee at another location.

Figure 1C:
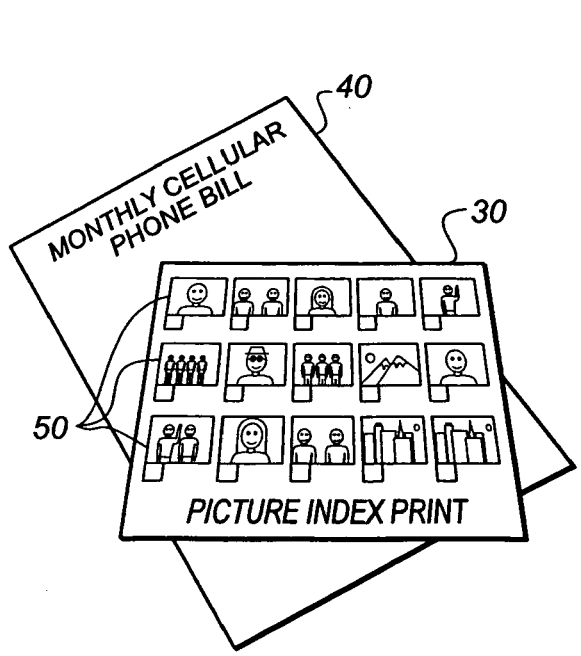

FIG. 1c depicts an index print 30 received by a customer along with a monthly cellular phone bill 40. The index print 30 contains imagettes 50 which are "thumbnail" image representations of all the pictures captured, transmitted and stored during the monthly billing period.

Figure 1D:
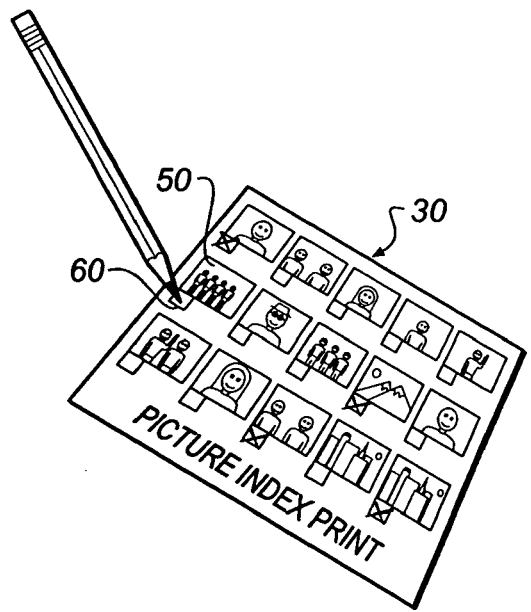

FIG. 1d illustrates the use of the index print 30 to select images for printing by checking the appropriate box 60 before returning the index print by mail to the service provider to order prints.

An apparatus suitable for use as the telecommunications and image capture device 10 of FIG. 1a and FIG. 1b is disclosed in U.S. Pat. No. 5,893,037, to Reele, which is hereby incorporated by reference. While the apparatus shown in the '037 patent has a different appearance from the device 10, the device 10 is illustrative only and, in fact, any device capable of both capture of digital still image data and communication of this digital image data to a telecommunications service provider would operate effectively in the present invention. Another example of such a device is described in U.S. Pat. No. 5,666,159 to Parulski. The '159 patent discloses an electronic camera which has a cellular telephone transceiver incorporated into it which is capable of transmitting digital image data.

The communication of the digital image data to a telecommunications service provider as shown in FIG. 1b by means of a wireless cellular telephone may be made automatic. Incorporation into the combined telecommunications and image capture device of the well-known review/edit/delete functionality of today's digital cameras allows the customer to be informed of the status of image memory capacity and when the image memory is full or almost full. The customer would then be signaled by the device and given a choice to delete additional pictures or to free up memory by transfer of images to the telecommunications service provider. Once a decision to transfer is made, the combined device would be programmed to automatically place a telephone call to the service provider, for example at a pre-programmed time of day when service rates for air time are low. The transferring of image data would be overridden if use of the combined device to place a cellular telephone call, for example in an emergency, was needed. Once the interrupting call was complete, the device would be programmed to resume the image transfer at the point where it had been broken off. The transfer process could be configured in a number of alternative ways; e.g. immediately upon capture of an image, or, when the device is automatically polled by a storage device, or on demand by the user at any time, or at a predetermined time of day, or when the memory reaches a specified capacity (not just when it is full), or when the device is in a specified geographic zone or region or location, or when the device is docked, or when the device is idle, or when the device is turned "off". There are also many alternative means which could be used to transfer image data to a telecommunications service provider including wired or wireless transmission to the internet, wired or wireless transmission to a cable television set-top box (which in turn is linked to an image storage facility), wired or wireless transmission to a modem, wired or wireless transmission to a local or wide-area network, wired or wireless transmission to a standard telephone line, or wired or wireless transmission to a kiosk (which in turn is linked to a telecommunications service provider). It is to be understood that the invention could operate with any other transmission means available, or any developed in the future, for sending image data to an image storage facility.

The storage and management of transferred images is a service which is coordinated and billed to a customer by a telecommunications service provider. FIG. 1c illustrates a preferred embodiment where images captured by a customer and transferred to the remote centralized storage facility during the regular periodic billing cycle of the telecommunications service provider have been delivered to the customer in the form of a hard copy index print 30 using the same delivery mechanism used to deliver the periodic telecommunications service invoice 40. It should be appreciated that delivery by electronic mail of an invoice and index print is a viable alternative, for example for display on the customer's home computer screen, cellular telephone display, set-top box in conjunction with a television set, or other display appliance able to receive information from the telecommunications service provider. Hard copy index prints could be delivered as a separate item inserted in the billing envelope as shown in FIG. 1c or in a form where it is integrated with the service invoice and/or service order form (see below). If it is desired to use the index print as an order form to order additional services, then more than one copy of the index print could be provided. The customer could, for example, use one copy of the index print to submit an order for services and later use another copy to submit an additional order; a third copy could be retained for the customer's permanent record.

The index print, whether delivered in hard copy form or as an electronic document for display on a computer screen, permits the customer to select image fulfillment services and products for any or all of the images. Such product or service offerings include, but are not to be limited to: hard copy photographic prints and enlargements, photographic gifts and accessories (e.g. coffee mugs, t-shirts, buttons, photographs composited with backgrounds, borders and templates, postal and greeting cards, plaques, etc.), archival storage of digital images, controlled image data sharing and distribution, electronic delivery of digital image data including electronic mail of digital image files, electronic postcards including multimedia postcards, greeting cards, or announcements, etc, or electronic image enhancement or modification.

FIG. 1d shows a preferred means for the customer to select image fulfillment products or services using the index print 30 as an order form. FIG. 1d illustrates a customer selecting a particular image for printing by checking a box 60 under a particular imagette 50 on the index print 30. The index print with images selected is returned to the telecommunications service provider or its designee by mail. Many other methods for the submission of product or service orders would also operate with the present invention. Some examples include placing an on-line order via the internet using a unique keycode identifier associated with the customer's stored digital image files, using an order form combined with an index print all included with the customer's periodic telecommunications service invoice delivered electronically to the customer's electronic mail address and displayed on the customer's computer; filling out a conventional paper order form and returning it to the telecommunications service provider or designee along with the customer's periodic payment for services, making a toll-free telephone call to the telecommunications provider or designee and placing an order for services by responding to an automated response system or speaking directly with a customer service representative where the toll free call is made in a conventional manner or by a "short-cut" method, such as pressing a single button on the customer's combined telecommunications and image capture device. The particular order methods given here are illustrative only and the invention would be expected to operate with other variations of ordering methods which might be envisioned.

Figure 2:
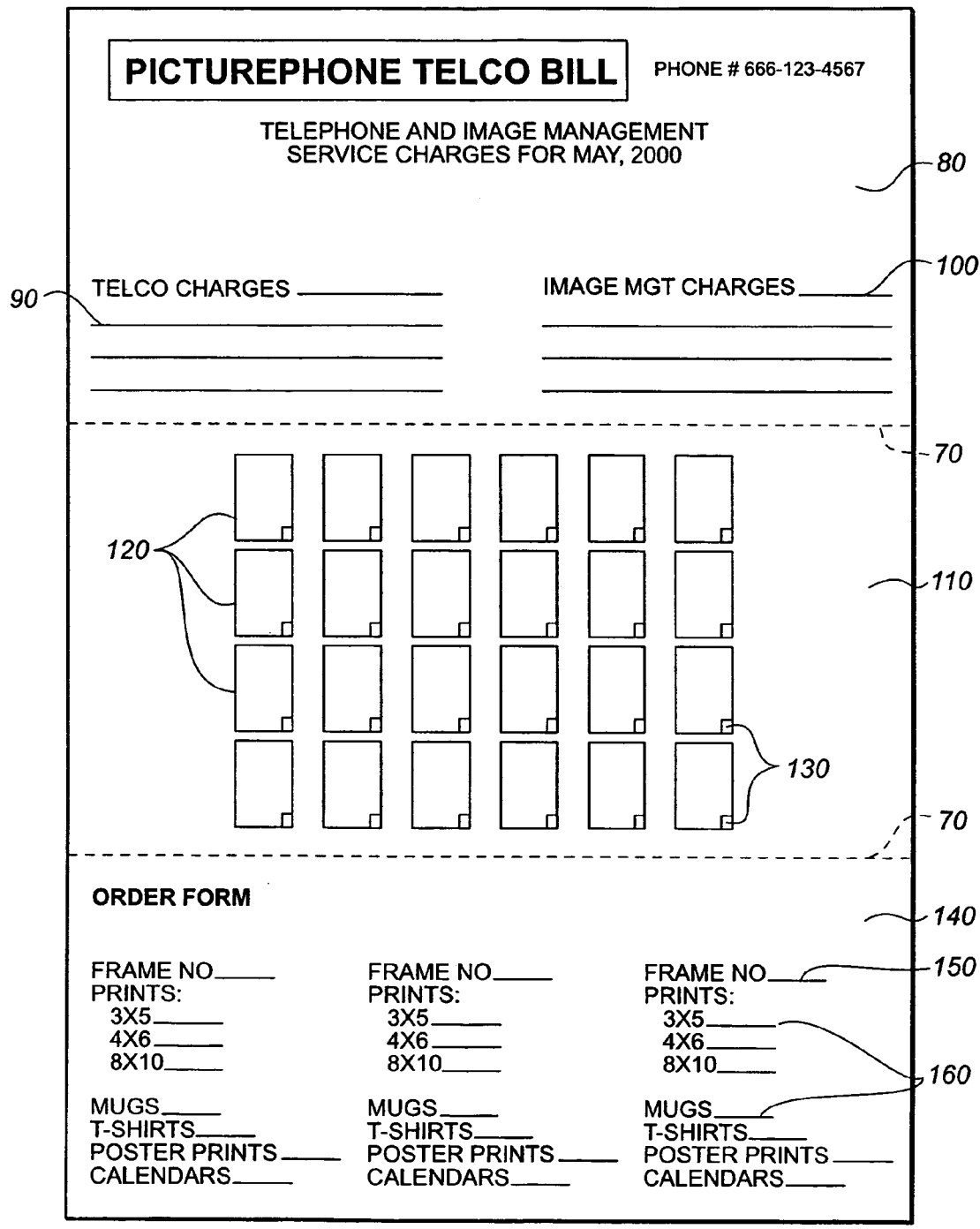
FIG. 2 is a plan view of an index print embodiment in accordance with one aspect of the present invention.

FIG. 2 depicts an alternative embodiment of the invention where a hard copy periodic billing form for telecommunication services has been integrated with both an index print and an order form for fulfillment services. Looking at FIG. 2, tear-off perforations 70 allow the separate sections of the billing form to be easily separable into separate sections. The billing invoice portion of the bill 80 contains a listing of telecommunications charges 90 and charges for image management and services 100, both of which have accrued during the billing period. The index print portion 110 of the integrated bill contains thumbnail images 120 of all images captured and transferred during the billing period. Each thumbnail image 120 has a frame number 130 associated with it. The order blank portion 140 of the bill is a form where order preferences with respect to particular frame number 150 and product or service preferences 160 can be indicated by marking the form in blank spaces provided for this purpose. In use, the form can be separated into its separate portions along the perforations so that the bill for services and index prints can be retained separately if so desired and the order form submitted by mail. Alternatively, the order form could serve as checklist and reminder to be used when an order is submitted by telephone or by the internet. It should be appreciated that the integrated billing statement, index print and order form of FIG. 2 is an illustrative example only, and that the invention would operate with any other variants of index prints combined with service invoices and order forms that may be envisioned.

Once an order has been placed by the customer for imaging products or services, the order is fulfilled by the telecommunications service provider or its designee and delivered to the customer or alternative party as designated by the customer via traditional or electronic means, appropriate to the particular product or service ordered and according to the customer's instructions.

Figure 3:
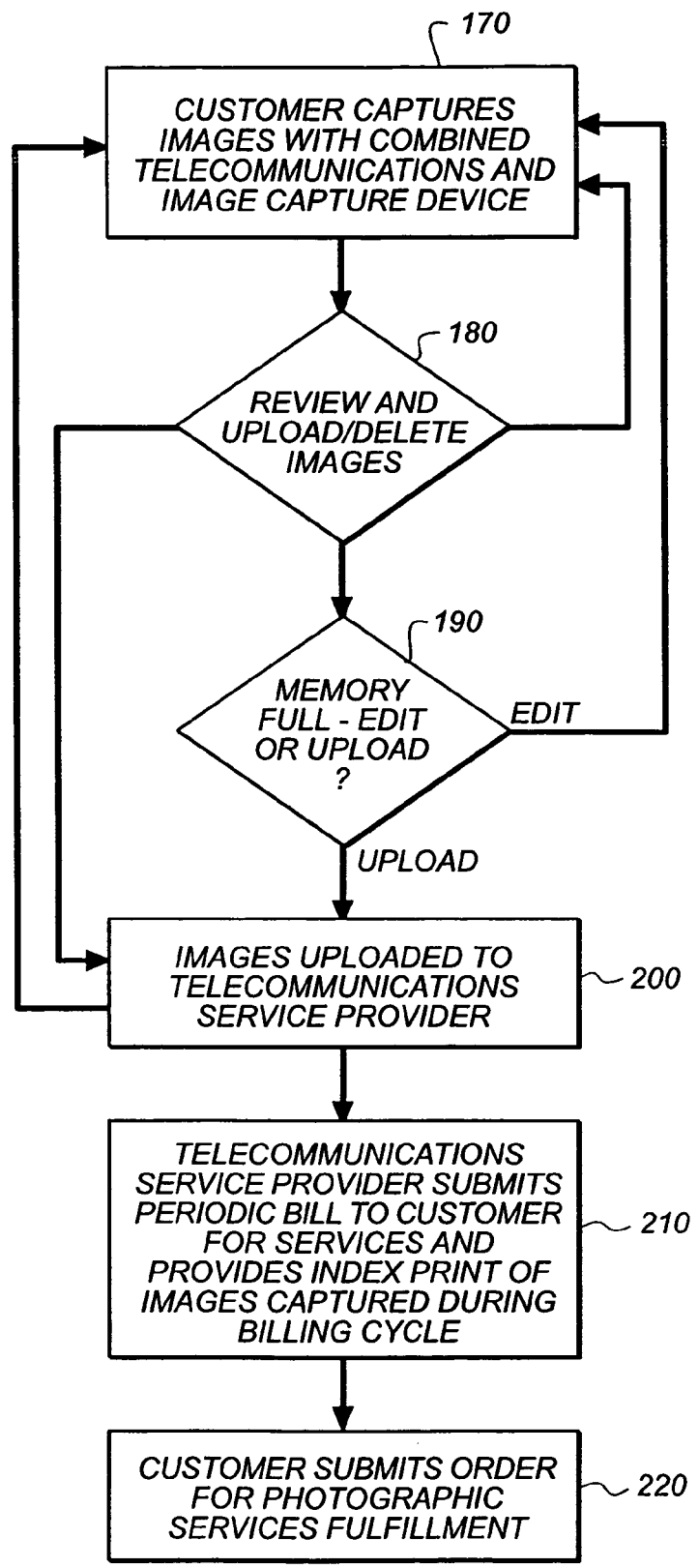
FIG. 3 is a flow-chart showing the steps on the overall operation of a particular embodiment of the present invention.

FIG. 3 shows a flow chart describing the overall operation of a preferred embodiment of the present invention. In step 170, the customer uses a combined telecommunications and image capture device to capture images as the opportunity arises. Images captured and stored may be reviewed in step 180 and deleted if judged by the customer to be not worth keeping or a decision to transfer all or some images may be made at any time. Use of the capture device to make captures and use of the edit/transfer functions can continue until the device's memory is actually full. The image memory capacity of the telecommunications and image capture device is monitored and if memory is full, the customer is prompted at step 190 to free up memory by either deleting or transferring at least one image. If image transfer is selected, the device is triggered at step 200 to automatically contact the service provider's (or its designee's) central receiving and storage database at a pre-determined time using cellular telephone communications and to transfer the images selected for transfer. In step 210, at the time the telecommunications service provider submits a periodic bill for services to the customer, an index print containing thumbnails of all the images captured and stored during the billing period is also sent to the customer for her review. Finally, at step 220 the customer submits an order for prints, enlargements or other photographic products or services as enumerated above.

Although not shown explicitly in FIG. 3, it will be appreciated that the system as described could also be easily modified to include additional features such as the ability to review and edit or delete any images stored in the customer's central data base account at any time using, for example, the customer's combined telecommunications and capture device fitted with an appropriate display or by accessing the account over the internet using a personal computer or kiosk location linked to the internet. As mentioned earlier, but also not shown explicitly in FIG. 3, the transfer step 200 could be configured in a number of alternative ways; e.g. immediately upon capture of an image, or, when the device is polled by another device, or on demand by the user at any time, or at a predetermined time of day, or when the memory reaches a specified capacity (not just when it is full), or when the device is in a specified zone or region, or when the device is docked, or when the device is idle, or when the device is turned "off". Finally, of course, new orders for products or services could also be submitted at any time using the retained copies of index prints as reference using, for example, the toll-free telephone options described earlier.

The particular services described in accordance with the invention may also be advantageously offered to the customer in a "bundled contract" of equipment and service offerings. In such a bundle the customer is offered, for example, a "one monthly billing" contract for a set period of time (e.g. 1–3 years) which provides the customer: (a) the use of the combined telecommunications and image capture device with an option for upgrade at a later time; (b) a pre-set amount of air time and a specific monthly charge rate for air time use thereafter of cellular telephone services; (c) a pre-set amount of image storage space; and (d) a pre-set monthly amount of photographic product or services, such as a certain number of hard copy prints per month. The particular product and service bundle described here is meant to be an example only and it will be appreciated that a very large number of variations of bundled product and service offerings can be within the scope of the present invention.

The invention has been described in detail with particular reference to certain preferred embodiments thereof, but it will be understood that variations and modifications can be effected within the scope of the invention.

PARTS LIST 10 combined telecommunications and image capture device
20 cellular telephone communications
30 index print
40 monthly cellular telephone bill
50 thumbnail images
60 box to select photographic service
70 perforated tear line
80 service charges portion of bill
90 telecommunications charges enumerated
100 image management charges enumerated
110 index print portion of bill
120 thumbnail images
130 frame numbers
140 order form portion of bill
150 area to indicate frame number choice
160 area to indicate photographic services choice
170 image capture step
180 review/edit/delete step
190 memory monitor step
200 customer decision step
210 bill and index print submission step
220 customer order step

What is claimed is:

1. A method of managing digital images captured by a customer using a combined portable telecommunications and digital image capture device, said method comprising:
   a telecommunication service provider providing a telecommunication service to a customer, said telecommunications service provider forwarding a periodic statement for telecommunication services provided to said customer for a predetermined time period;
   providing a data base for receiving and storing said digital images from said customer using said combined telecommunications device to transmit said digital images to said service provider; and
   said telecommunication service provider providing to said customer a visual representation of said captured images taken during said predetermined time period along with said periodic statement.

2. A method according to claim 1 comprising the further step of editing of said digital images prior to transmitting said images to said service provider.

3. A method according to claim 1 comprising the further step of ordering photofinishing goods and/or services with respect to said images included in said visual representation.

4. A method according to claim 3 wherein the step of ordering photofinishing goods and/or services further comprises completing and returning a paper order form.

5. A method according to claim 4 wherein the step of ordering photofinishing goods and/or and payment for said telecommunications are returned together toe said telecommunication service provider.

6. A method according to claim 3 wherein the step of ordering photofinishing goods and/or services further comprises placing an order by telephone.

7. A method according to claim 3 wherein the step of ordering photofinishing goods and/or services further comprises placing an on-line order via the internet.

8. A method according to claim 1 comprising the further step of:
   providing by said telecommunications service provider one combined periodic billing to said customer for the use of said combined portable telecommunication and image capture device, and for the use of said telecommunication services, and for storage and management of said captured images.

9. A system for managing digital images of a customer, said system comprising:
   a telecommunication service provider for providing a telecommunication service to a customer, said telecommunication service provider forwarding a periodic statement for telecommunications services provided to said customer for a predetermined time period;
   a combined portable telecommunications and digital image capture device capable of capturing digital images and also for transmitting said captured images to said telecommunications service provider;
   a data base for receiving and storing said captured images transmitted from said customer; and
   a computer used by said service provider for managing and associating said telecommunications and image storage services for said customer and for providing a visual representation of said captured images captured during said predetermined time period along with said periodic statement.

10. A system according to claim 9 wherein said visual representation is an electronic display.

11. A system according to claim 9 wherein said visual representation is a hard copy print.

12. A system according to claim 9 wherein said telecommunication services comprises telephone services.

13. A system according to claim 9 wherein said portable combined telecommunication and image capture device comprises a combined cellular phone and a digital camera.

14. A system according to claim 9 wherein said portable combined telecommunication and image capture device includes a selection device for editing of said digital images prior to transmitting said images to said data base.

* * * * *